United States Patent [19]

Fried et al.

[11] Patent Number: 5,142,676
[45] Date of Patent: Aug. 25, 1992

[54] SEPARATE CONTENT ADDRESSABLE MEMORIES FOR STORING LOCKED SEGMENT ADDRESSES AND LOCKING PROCESSOR IDENTIFICATIONS FOR CONTROLLING ACCESS TO SHARED MEMORY

[75] Inventors: Jeffrey A. Fried, Somerville, Mass.; Christopher P. Rosebrugh, Lake Oswego, Oreg.

[73] Assignee: GTE Laboratories Incorporated, Waltham, Mass.

[21] Appl. No.: 291,070

[22] Filed: Dec. 28, 1988

[51] Int. Cl.⁵ .................. G06F 12/14; G06F 12/00
[52] U.S. Cl. ............................ 395/425; 364/DIG. 2; 364/245.6; 364/245.7; 364/246.6; 364/246.8; 364/259.2; 364/967.2; 364/969; 364/969.2
[58] Field of Search ... 364/200 MS File, 900 MS File; 365/49; 395/425

[56] References Cited

U.S. PATENT DOCUMENTS

| | | | |
|---|---|---|---|
| 4,055,851 | 10/1977 | Jenkins et al. | 364/200 |
| 4,214,304 | 7/1980 | Shimizu et al. | 364/200 |
| 4,241,401 | 12/1980 | De Ward et al. | 364/200 |
| 4,377,855 | 3/1983 | Lavi | 365/49 |
| 4,488,217 | 12/1984 | Binder et al. | 364/200 |
| 4,574,350 | 3/1986 | Starr | 364/200 |
| 4,580,217 | 4/1986 | Celio | 364/200 |
| 4,587,609 | 5/1986 | Boodreau et al. | 364/200 |
| 4,665,484 | 5/1987 | Nanba | 364/200 |
| 4,669,043 | 5/1987 | Kaplinsky | 364/200 |
| 4,733,352 | 3/1988 | Nakamura et al. | 364/200 |
| 4,755,974 | 7/1988 | Yamada et al. | 365/49 |
| 4,858,116 | 8/1989 | Gillett, Jr. et al. | 364/200 |
| 4,891,749 | 1/1990 | Hoffman et al. | 364/200 |
| 4,941,083 | 7/1990 | Gillett, Jr. et al. | 364/200 |
| 4,945,512 | 7/1990 | De Karske et al. | 365/49 |
| 4,949,239 | 8/1990 | Gillett, Jr. et al. | 364/200 |
| 4,959,811 | 9/1990 | Szczepanek | 365/49 |
| 4,975,870 | 12/1990 | Knicely et al. | 364/900 |
| 4,984,153 | 1/1991 | Kregness et al. | 364/200 |
| 4,996,666 | 2/1991 | Duluk, Jr. | 365/49 |

OTHER PUBLICATIONS

M. Raynal, Algorithm for Mutual Exclusion, the MIT Press, Chapter 3, pp. 39-44.
T. Kohonen, Content Addressable Memories, Springer-Verlag, New York, 1980, pp. 241-261.
Signetics SCC68920 Memory Access Controller Specification, Sep. 1986.
Glasser et al., "The Design and Analysis of VLSI Circuits", Addison-Wesley 1985, pp. 390, 292.
Weste et al., "Principles of CMOS VLSI Design", Addison-Wesley, 1985, pp. 349-353.

Primary Examiner—Thomas C. Lee
Assistant Examiner—Krisna Lim
Attorney, Agent, or Firm—Wolf, Greenfield & Sacks

[57] ABSTRACT

A locking circuit for controlling access to locked segments of a shared memory includes a content-addressable memory for storing addresses of the locked memory segments and for simultaneously comparing a target address with the addresses of the locked memory segments and providing a match signal when the target address matches one of the addresses of the locked memory segments. During a memory access cycle, a target address is supplied to the content-addressable memory, and a control circuit is responsive to the match signal to inhibit completion of the memory access cycle. A locking ID, which identifies the processor or process that locked the memory segment, is stored in a second memory. During a memory access cycle, a requesting ID is compared with the locking ID of the locked segment which produced the match signal. When the locking ID and the requesting ID match, the memory access cycle is enabled. Additional verification fields, such as security keys and access codes, can be used to control access to the shared memory.

17 Claims, 3 Drawing Sheets

SEPARATE CONTENT ADDRESSABLE MEMORIES FOR STORING LOCKED SEGMENT ADDRESSES AND LOCKING PROCESSOR IDENTIFICATIONS FOR CONTROLLING ACCESS TO SHARED MEMORY

FIELD OF THE INVENTION

This invention relates to a locking circuit for controlling access to a shared memory and, more particularly, to a locking circuit using a content-addressable memory for high speed operation.

BACKGROUND OF THE INVENTION

Multiprocessing systems such as those found in computers, control systems, switching systems and graphics controllers, require a way for different processes to communicate and to share common information. These processes may be different programs running on physically separate processors, different users in a timeshared or multithreaded computer system, or different program fragments in a distributed computer system. Information sharing is often accomplished through the use of globally shared data, either in a common memory or distributed in several locations.

Whenever concurrent processors share common data, there is a possibility that they will interfere with each other when they access the common data. The interference can take several forms: one process may be delayed by another through contention for access to the data, the data may be corrupted through timing anomalies between reads and writes from different processes, or two processes may deadlock, with each waiting for the other to update the common data. In order avoid such interference, it is crucial for the system to include a means of access control to arbitrate between processes which share data.

A number of techniques have been developed in operating system theory to control access to common resources, including locks, semaphores, monitors and serializers. Of these techniques, only locking can be applied without significantly changing the timing of other processes. Locking is important in multiple processor systems and distributed systems, and where processes have been designed independently of each other. Locking is a technique in which each process requests exclusive access to a block of data when interference is likely to cause problems. No other process may access the block of data until the original requestor releases it. Locks may be of different types. For example, a system may include a write lock to prevent any other process from reading data until the lock holder updates it and a read lock to prevent any other process from updating a block of data while the lock holder reads it, while allowing other processes to read the data. Locks may also be used to selectively grant or deny access to specific processes.

In the past, software approaches to locking control have required a number of processor instructions (typically 10 to 25) to check for locks on every memory access. It is apparent that such a locking scheme presents a significant penalty in system operating speed. Hardware solutions to the mutual exclusion problem are discussed by M. Raynal in *Algorithms for Mutual Exclusion*, the MIT Press, Chapter 3, pages 39-44. All known locking techniques have resulted in a time penalty to perform the locking function.

Content-addressable memories have been used in connection with mapping of memory systems. See for example, T. Kohonen, *Content Addressable Memories*, Springer Verlag, New York, 1980, pp 241-261; U.S. Pat. No. 3,755,791 issued Aug. 28, 1973 to Arzubi; and U.S. Pat. No. 3,848,234 issued Nov. 12, 1974 to MacDonald. However, none of these references relate to controlling access to locked segments of a shared memory.

It is a general object of the present invention to provide improved multiprocessor, timeshared and distributed computer systems.

It is another object of the present invention to provide a locking circuit for controlling access to shared memory.

It is a further object of the present invention to provide an extremely fast locking circuit for controlling access to shared memory.

It is yet another object of the present invention to provide a locking circuit for controlling access to shared memory wherein lock checking is performed simultaneously with a memory access cycle.

SUMMARY OF THE INVENTION

According to the present invention, these and other objects and advantages are achieved in a locking circuit for controlling access to locked segments of a shared memory. The locking circuit comprises a content-addressable memory for storing addresses of the locked memory segments and for comparing a target address with the addresses of the locked memory segments and providing a match signal when the target address matches one of the addresses of the locked memory segments. During a memory access cycle, a target address is supplied to the content-addressable memory, and a control circuit is responsive to the match signal for inhibiting completion of the memory access cycle.

The locking circuit preferably includes means for storing a locking identification (ID) corresponding to each locked memory segment. The locking ID identifies the processor or process that locked the memory segment. When a locked memory segment is found during a memory access cycle, a requesting ID is compared with the locking ID of the locked memory segment which produced a match signal. The requesting ID identifies the processor or process that is requesting access to the target address. When the requesting ID matches the locking ID, the memory access cycle is completed. Otherwise, the memory access cycle is inhibited. The locking ID's can be stored in a RAM or in a content-addressable memory. The locking ID's and the requesting ID's represent different processors or different processes which have access to a common memory space.

The locking circuit further includes means for writing addresses of locked memory segments into storage locations in the content-addressable memory and means for clearing addresses of locked memory segments from the content-addressable memory.

In addition to the locking processor ID, keys or access codes can be stored at addresses corresponding to locked memory segments. The keys or access codes can be used to implement security keys and other preconditions to accessing of locked memory segments.

In order to lock blocks of memory rather than specific addresses, predetermined bits of the address can be ignored or masked when comparing a target address with addresses of the locked memory segments stored in the content-addressable memory. For example, by masking the least significant bits of the address during the comparison, a contiguous memory block can be defined by a single address stored in the content-addressable memory.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
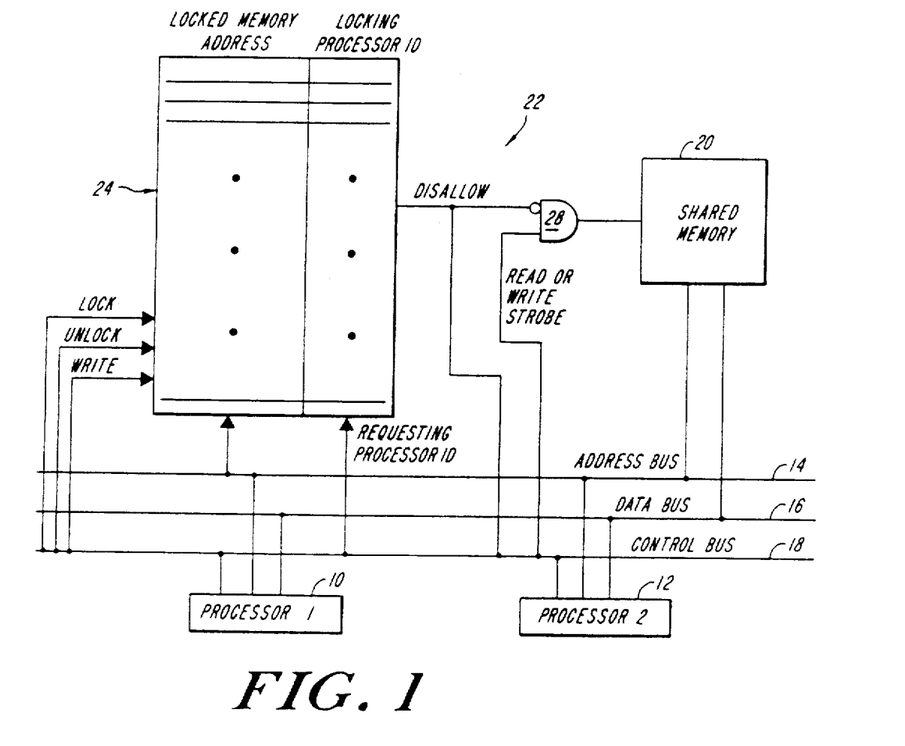
FIG. 1 is a simplified block diagram of a multiprocessor system incorporating the locking circuit of the present invention.

A block diagram of a multiprocessor system incorporating a locking circuit in accordance with the present invention is shown in FIG. 1. A first central processor 10 and a second central processor 12 communicate over an address bus 14 and a data bus 16 with a shared memory 20. In conventional manner, each of the processors 10, 12 places a target address on address bus 14 to access a location in the shared memory 20. A read or write strobe carried on a control bus 18 enables completion of a memory access cycle in which data is written to or read from the addressed location on data bus 16.

When the processors 10 and 12 can access the same locations in shared memory 20, it is necessary to prevent interference. Thus, for example, when a process on processor 10 is using a specified location or group of locations in the shared memory 20, processor 12 must be prevented from altering the specified memory locations. In accordance with present invention, a high speed locking circuit 22 prevents interference between processors 10 and 12 and controls access to the shared memory 20. The locking circuit 22 is represented schematically in FIG. 1 by a table 24 having multiple locations for storing locked memory addresses and a gate 28 for inhibiting or enabling the read or write strobe. Each locked memory address represents a segment of shared memory 20 that is locked. The locked memory segment can have any desired size from a single word to a block of the shared memory 20.

Associated with each locked memory address in table 24 is a locking processor identification (ID) which identifies the processor that caused that memory segment to be locked. As described hereinafter, the locking processor ID is used to permit access to the locked memory segment by the locking processor, while blocking access by other processors.

In operation, when a processor begins executing a process and wishes to lock a segment of the shared memory 20 to prevent access by other processors, the address of that memory segment is loaded into table 24 with the locking processor ID. When a memory access cycle is initiated by either processor, the target address is supplied to the table 24. As described hereinafter, the table 24 is implemented as a content-addressable memory. The target address is simultaneously compared with all of the locked memory addresses contained in table 24. The locking circuit then determines whether to allow or disallow the memory access cycle to be completed. The locking circuit generates a DISALLOW signal which is gated with the read or write strobe for the shared memory 20 in the gate 28. When the locking circuit allows the memory access cycle, the read or write strobe is applied to the shared memory 20 in normal fashion and the memory access cycle is completed. When the locking circuit disallows the memory access cycle, the read or write strobe is inhibited from reaching the shared memory 20. The DISALLOW signal is provided on the control bus 18 to the requesting processor as an indication that the memory access cycle was not completed. The requesting processor can repeat the request at a later time.

A requesting processor ID is supplied to table 24 on the control bus 18. The requesting processor ID is compared with the locking processor ID corresponding to the locked memory address that matches the target address. Access to the locked memory segment is permitted only when the requesting processor ID matches the locking processor ID. Also supplied to the table 24 on the control bus 18 are LOCK, UNLOCK and WRITE signals used in entering and deleting information in table 24.

In the configuration of FIG. 1, there are three possible conditions that result from operation of the locking circuit: 1) The target address is not found in table 24. This indicates that the target address is not locked, and the memory access cycle is allowed to be completed. 2) The target address is found in table 24, and the requesting processor ID matches the locking processor ID for the target address. In this case, the memory access cycle is allowed to be completed. 3) The target address is found in table 24, and the requesting processor ID does not match the locking processor ID for the target address. In this case, completion of the memory access cycle is disallowed, or inhibited. The requesting processor must wait until a later time to perform the memory access cycle.

Figure 2:
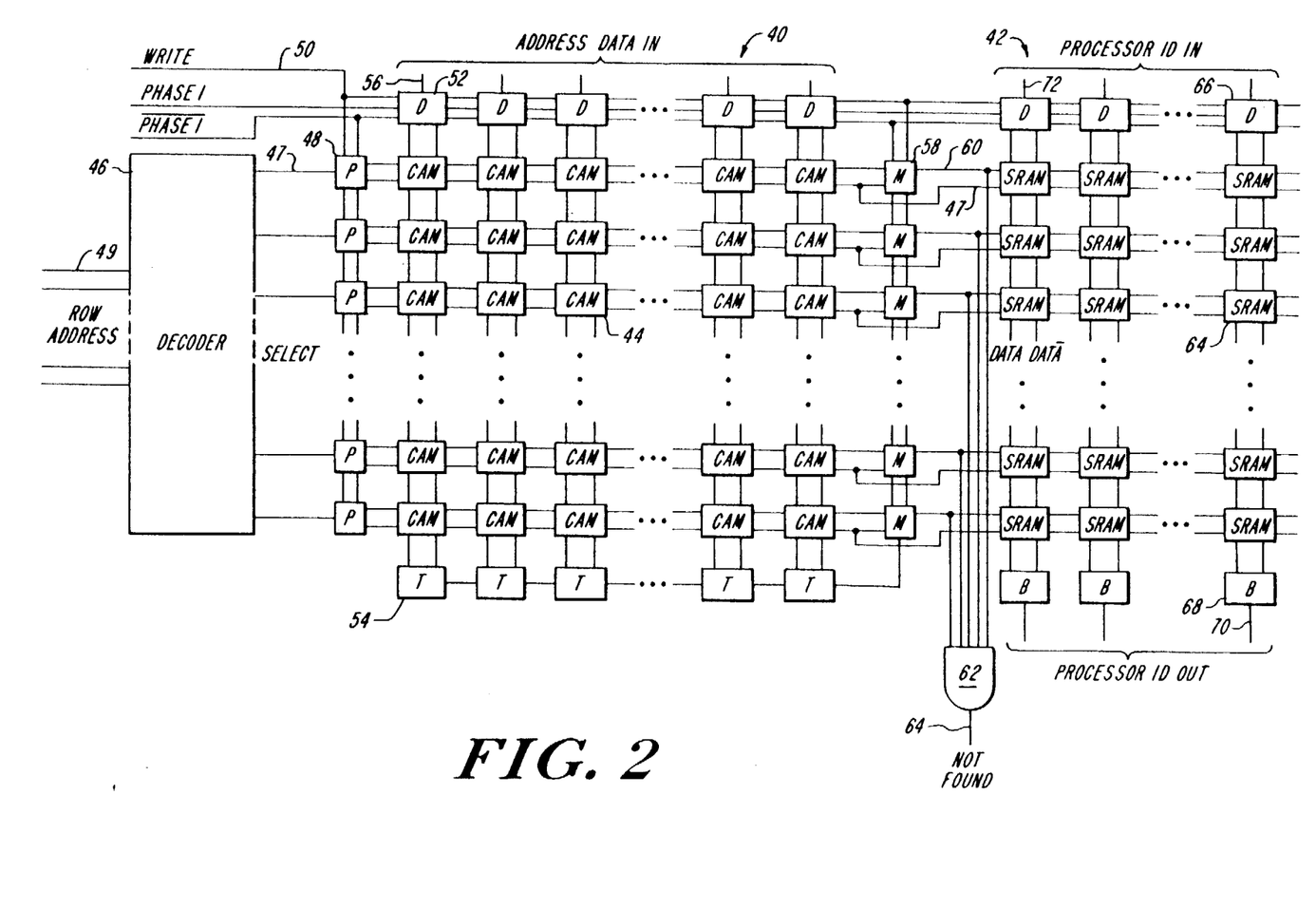
FIG. 2 is a schematic diagram of the storage section of the locking circuit in accordance with the present invention.
Figure 3:
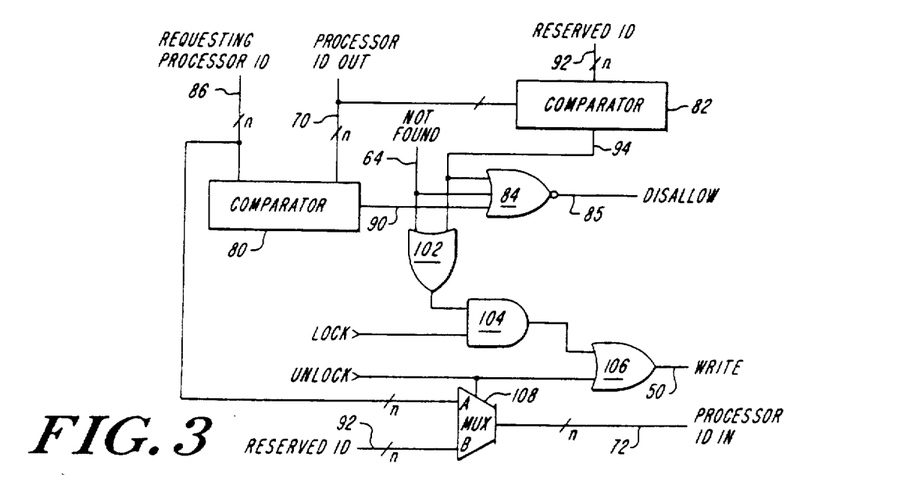
FIG. 3 is a schematic diagram of the control section of the locking circuit in accordance with the present invention.

A preferred embodiment of the locking circuit in accordance with the present invention is shown in FIGS. 2 and 3. Circuitry for storing locked memory addresses and locking processor ID's is shown in FIG. 2. Associated control circuitry is shown in FIG. 3. The locked memory addresses are stored in a content-addressable memory 40, and the locking processor ID's are stored in a static random access memory (SRAM) 42. The content-addressable memory 40 and the memory 42 constitute the table 24 shown in FIG. 1 and described hereinabove.

The content-addressable memory 40 includes an array of memory cells 44, labelled CAM, together with control circuitry. The array of memory cells is arranged in a matrix of J rows by K columns (for example, 16 rows by 10 columns) thus providing the capability of storing J, K-bit (16, 10 bit) locked memory addresses. Each memory cell 44 includes circuitry for storing a single bit of digital information and for comparing the stored bit with the corresponding input bit of the target address during a match operation. The content-addressable memory 40 stores individual locked memory addresses one address at a time in a row of memory cells and compares a target address to each of the locked memory addresses simultaneously.

The content-addressable memory 40 includes a decoder 46 for decoding binary coded row address inputs 49 to provide a select signal on one of J select lines 47, one to each of the rows of the memory cells. For each row of memory cells 44, there is a precharge circuit 48, labelled P. Each precharge circuit 48 causes the associated row of memory cells to store bits representing a locked memory address in response to a WRITE signal on a write line 50 during a select signal. Each precharge circuit 48 also produces signals to the memory cells of its associated row to enable the locked memory address stored in the row of memory cells to be compared with a target address.

For each column of memory cells 44 there is data input circuitry including a drive circuit 52, labelled D, and an associated termination circuit 54, labelled T. Bits of data are supplied on data input lines 56 to the drive circuits 52. During a write operation, the bits of a word present at the input terminals 56 are stored in response to a WRITE signal in the row of memory cells designated by a select signal. During a memory access cycle, the target address is supplied to the data input terminals 56. The bits of the target address are applied to all the rows of memory cells for comparison with each of the locked memory addresses.

A match output circuit 58, labelled M, is associated with each row. The match circuit 58 holds an indication of the match or no-match results of the comparison of the target address with the locked memory address stored in that row and gates a match signal onto a match output line 60.

It will be understood that the number of columns and rows in the content-addressable memory 40 depends on the number of bits in the locked memory address and the number of locked memory addresses, respectively, which may occur in a given system. While various circuits can be used to implement the content-addressable memory, a preferred, very high speed content-addressable memory is described in copending application Ser. No. 185,624, filed Apr. 25, 1988 and assigned to the assignee of the present application, which application is hereby incorporated by reference.

The match output line 60 for each row of memory cells is connected to one input of an AND gate 62. An output 64 of gate 62 is in a first logic state when a match between a target address and one of the locked memory addresses is found and is in a second logic state when no such match is found. The output on line 64 is a NOT FOUND signal which provides an indication of whether the target address is locked. When the NOT FOUND signal is asserted, the target address is not locked.

The memory 42 for storing the locking processor ID is implemented as a static random access memory including an array of memory cells 64, labelled SRAM, together with control circuitry. Each of the memory cells 64 stores one bit of digital information. The array of cells in the memory 42 is arranged in a matrix of J rows by L columns. The number of rows, J, is the same as the number of rows in the content-addressable memory 40, and the number of columns, L, corresponds to the number of bits required to identify the locking processor. In an example of the memory 42, 16 rows and 4 columns are provided. The memory 42 further includes driver circuits 66, labelled D, and sense amplifiers 68, labelled B. Each row of memory cells in content-addressable memory 40 for storing a locked memory address has an associated row of memory cells in memory 42 for storing the corresponding locking processor ID.

The match output from each row of memory cells in content-addressable memory 40 is coupled to a read enable input of each memory cell 64 in the corresponding row of memory 42. When a match is found in content-addressable memory 40, the corresponding match output line 60 is asserted and enables the corresponding row of memory 42. The data stored in the enabled row appears on output lines 70 from memory 42 and represents the locking processor ID of the locked memory address for which a match was found.

During a write operation, the locking processor ID is supplied to data inputs 72 of memory 42. Row select lines 47 from each row of the content-addressable memory 40 are coupled to write enable inputs of each memory cell 64 in the corresponding row of memory 42. Thus, when a locked memory address is written into the content-addressable memory 40, the corresponding locking processor ID is simultaneously written into the selected row of memory 42.

The control circuitry for the locking circuit is shown in FIG. 3. A lock checking operation is performed during a memory access cycle by a comparator 80, a comparator 82 and an NOR gate 84. The gate 84 has three inputs which allow completion of the memory access cycle. The output of gate 84 on a line 85 is the DISALLOW signal. When the DISALLOW signal is asserted, completion of the memory access cycle is inhibited. Otherwise, completion of the memory access cycle is enabled. The NOT FOUND signal on line 64 is coupled from gate 62 (FIG. 2) to one input of gate 84. When the NOT FOUND signal is asserted, the target address was not found in the content-addressable memory 40 and thus is not locked. In this case, the DISALLOW signal is not asserted, the memory access cycle is completed.

When a match is found between the target address and one of the locked memory addresses in content-addressable memory 40, the NOT FOUND signal is not asserted, and the requesting processor ID is compared with the locking processor ID. The requesting processor ID is supplied from the requesting processor to one input of comparator 80 on lines 86, and the locking processor ID is supplied from memory 42 to the other input of comparator 80 on lines 70. The output of comparator 80 on a line 90 is coupled to an input of gate 84. As indicated previously, one row of memory cells 64 in memory 42 is enabled by one of the match output lines 60 from content-addressable memory 40. Thus, the output on lines 70 represents the locking processor ID of the locked memory address which matches the target address. When the comparator 80 finds a match between the locking processor ID and the requesting processor ID, its output on line 90 is asserted. The DISALLOW signal is not asserted, and the memory access cycle is completed. Under these circumstances, the locking processor is permitted to access the memory segment which it previously locked. When the requesting processor ID does not match the locking processor ID, the output of comparator 80 is not asserted, and the DISALLOW signal is asserted, thereby inhibiting completion of the memory access cycle. This is the normal situation in which locking is desired.

The comparator 82 is utilized to insure completion of the memory access cycle when a row of memory cells in content-addressable memory 40 is cleared. In the present example, when a locked memory address is cleared from the locking circuit, the corresponding row of the content-addressable memory 40 is reset to all zeros, and the corresponding row of the memory 42 is reset to a reserved processor ID of all ones. The reserved processor ID is not assigned to any processor in the system. The reserved processor ID is supplied on lines 92 to one input of comparator 82, and the output of memory 42 on lines 70 is supplied to the other input of comparator 82. The output of comparator 82 on a line 94 is coupled to an input of gate 84. When a match condition is found by comparator 82, its output on line 94 is asserted. The DISALLOW signal is not asserted, and the memory access cycle is completed. Thus, cleared or reset locations in the locked memory address table do not prevent memory access cycles from being completed. Furthermore, this arrangement permits all addresses in the memory space to be locked.

The locking and unlocking of memory segments by writing or clearing memory addresses from table 24 is performed by gates 102, 104 and 106 and a multiplexer 108. The NOT FOUND signal and the output of comparator 82 are coupled to the inputs of OR gate 102. The output of OR gate 102 and a LOCK signal are coupled to the inputs of AND gate 104. The output of gate 104 and the UNLOCK signal are coupled to the input of OR gate 106. The output of gate 106 is the WRITE signal which is supplied on line 50 to the content-addressable memory 40. The UNLOCK signal is also coupled to the control input of multiplexer 108. One data input of multiplexer 108 is the requesting processor ID on lines 86. The other data input of multiplexer 108 is the reserved processor ID (lines 92), which is written into a row of memory 42 when the corresponding row of the content-addressable memory 40 is cleared.

When a memory segment is to be locked, the address of the segment is entered into a cleared row of the content-addressable memory 40. The row address 49 can be allocated to each processor either through software means or via a dynamic allocation scheme such as least recently used (LRU). The LOCK signal supplied to gate 104 is asserted. The gate 102 enables gate 104 if one of two conditions is satisfied. 1) If the address to be locked is not found, as indicated by a NOT FOUND signal on line 64, locking can proceed. This test verifies that the memory segment to be locked has not previously been locked by another processor. 2) The input from comparator 82 verifies that, even if the address to be locked was found in the content-addressable memory 40, the address is not locked because the associated location in memory 42 indicates a reset or cleared state. The LOCK signal is supplied through gates 104 and 106 to provide the WRITE signal to content-addressable memory 40. The locked memory address appearing at input lines 56 is loaded into a selected row of memory cells 44. At the same time, the UNLOCK signal is not asserted, and the multiplexer 108 selects the locking processor ID from lines 86. The outputs of multiplexer 108 are coupled on lines 72 to the inputs of memory 42, and the locking processor ID is loaded into the row of memory cells in memory 42 which corresponds to the location of the locked memory address.

When it is desired to unlock a memory segment, the address of that memory segment must be cleared from the content-addressable memory 40. The UNLOCK signal is asserted, thereby, providing a WRITE signal on line 50 to content-addressable memory 40. The UNLOCK signal also causes the multiplexer 108 to select inputs 92 corresponding to the reserved processor ID, or reset value. As noted above, the reset value is preferably all ones. The reset value is provided by multiplexer 108 on lines 72 to the corresponding row in memory 42 so that the locked memory address is effectively cleared.

Figure 4:
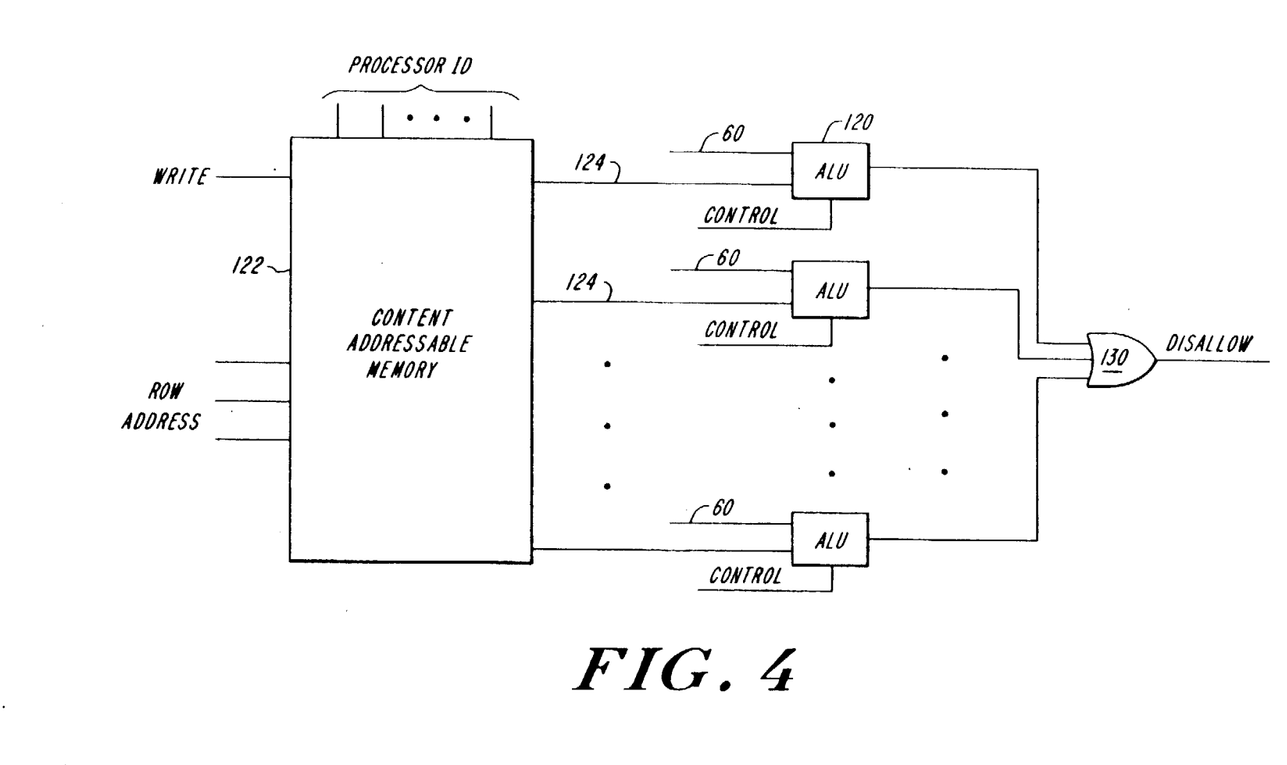
FIG. 4 is a schematic diagram of an alternate embodiment of the present invention in which the locking processor ID is stored in a content-addressable memory.

An alternate embodiment of the locking circuit is illustrated in FIG. 4. The locking circuit includes a content-addressable memory 40 for storage of locked memory addresses as shown in FIG. 2. The content-addressable memory 40 is omitted from FIG. 4 for simplicity. Each of the match lines 60 from content-addressable memory 40 is coupled to an input of an arithmetic logic unit 120, labelled ALU. In the embodiment of FIG. 4, the locking processor ID's are stored in a content-addressable memory 122. The content-addressable memory 122 can have the same structure as content-addressable memory 40 except that it may include a different number of memory cells.

The content-addressable memory 122 stores locking processor ID's in the row corresponding to the locked memory address. This is accomplished by providing the same row select inputs to the content-addressable memories 40 and 122 during a write operation. The match outputs from content-addressable memory 122 on match lines 124 are coupled to second inputs of the arithmetic logic units 120. Thus, each ALU 120 receives the match line 60 from one row of content-addressable memory 40 and the match line 124 from the corresponding row of content-addressable memory 122. Each ALU 120 performs a logical operation on the match signals, as defined by a control input. In the present example, locking is desired when a match is found between the target address and one of the locked memory addresses and when the requesting processor ID does not match the locking processor ID for the corresponding locked memory address. For simple logic functions, each ALU 120 can be replaced with one or more logic gates. The outputs of ALU's 120 represent a locked condition in which the memory access cycle is inhibited. The outputs of ALU's 120 are coupled to the inputs of an OR gate 130. The output of OR gate 130 is the DISALLOW signal which prevents completion of the memory access cycle.

The locking circuits shown in FIGS. 1-4 and described hereinabove have utilized two criteria in defining a locked condition: 1) a match between the target address and one of the locked memory addresses, and 2) the requesting processor ID is different from the locking processor ID. In accordance with the present invention, the locking circuit can be generalized to include one or more additional verification fields, such as a user ID or a security key, which require a match before permitting completion of the memory access cycle. The additional fields can be implemented, in the locking circuit of FIG. 4, as an additional content-addressable memory for storing the additional field. The match line for each row of the additional content-addressable memory is coupled to the logic for determining whether the memory access cycle is to be completed. The quantity stored in the additional content-addressable memory is compared with a quantity supplied with the target address and requesting processor ID. When the values fail to meet a predetermined criteria, the memory access cycle is inhibited.

It is frequently desirable to lock a block of memory containing a predetermined number of storage locations. When all bits of the target address are compared with all bits of the locked memory addresses, a match condition is obtained only for a single memory location. In order to lock blocks of memory including multiple addresses, portions of the address are masked from the comparison. For example, in a 10 bit address, the four least significant bits can be masked from the comparison. The masked bits define a 16-location block. A match is obtained when the target address matches the address of any of the 16 masked locations. The number of masked bits can be selected to correspond to the size of a block which is to be locked. When intermediate bits of the address are masked from the comparison, spaced-apart memory segments are locked. The selection of bits to be masked from the comparison can be tailored to a particular application.

With the locking circuit described hereinabove, lock checking can be performed in parallel with a memory access cycle. The preferred embodiment of the content-addressable memory 40 described hereinabove has a match time of 4 nanoseconds. The comparison is completed in the first portion of the memory access cycle, and the DISALLOW signal is available before the read or write strobe is applied to the memory. Thus, the locking circuit operates without any time penalty in processor operation.

The locking circuit of the present invention has been described thus far in connection with a multiprocessor system wherein two or more processors access shared memory on a common bus. The locking circuit of the present invention can also be utilized in a single processor, timeshared system wherein two or more processes can access a common memory space. The locking circuit can also be utilized in a distributed computer system including one or more remotely-located processors having access to a shared memory.

While there has been shown and described what is at present considered the preferred embodiments of the present invention, it will be obvious to those skilled in the art that various changes and modifications may be made therein without departing from the scope of the invention as defined by the appended claims.

What is claimed is:

1. In a computer system, a locking circuit for controlling access to locked segments of a shared memory in a memory access cycle, comprising:
a first content-addressable memory including multiple storage locations for storing addresses of said locked segments and means for simultaneously comparing a target address of the memory access cycle with contents of each of the storage locations and providing a first match signal indicative of a match condition when said target address matches one of the addresses of said locked segments;
verification means, responsive to said first match signal and to a requesting processor identification (ID), for enabling completion of said memory access cycle only when said requesting processor ID meets a predetermined criteria, said verification means comprising a second content-addressable memory; and
control means responsive to said first match signal for inhibiting completion of said memory access cycle.

2. A locking circuit as defined in claim 1 wherein said second content-addressable memory stores a locking processor ID corresponding to each of the locked segments and includes means for enabling completion of said memory access cycle when said requesting processor ID matches the locking processor ID corresponding to the locked segment for which a match condition was found.

3. A locking circuit as defined in claim 2 further including means for writing addresses of the locked segments into said first content-addressable memory.

4. A locking circuit as defined in claim 3 further including means for clearing addresses of the locked segments from said first content-addressable memory.

5. A locking circuit as defined in claim 1 further including means for masking selected bits from the comparison of the target address with the addresses of the locked segments.

6. In a computer system, a locking circuit for controlling access to locked segments of a shared memory in a memory access cycle, comprising:
a first content-addressable memory including multiple storage locations for storing addresses of said locked segments and means for simultaneously comparing a target address of the memory access cycle with contents of each of the storage locations and providing a first match signal indicative of a match condition when said target address matches one of the addresses of said locked segments;
control means responsive to said first match signal for inhibiting completion of said memory access cycle;
verification means responsive to said first match signal and to a requesting processor identification (ID) for enabling completion of said memory access cycle only when said requesting processor ID meets a predetermined criteria, said verification means including
a means for storing a locking processor ID corresponding to each of the locked segments, wherein said means for storing a locking processor ID comprises a second content-addressable memory including multiple storage locations, one storage location in said second content-addressable memory corresponding to each storage location in said first content-addressable memory, said second content-addressable memory including means for simultaneously comparing a requesting processor ID with each of the locking processor ID's and providing a second match signal for each storage location in said second content-addressable memory which matches the requesting processor ID; and
means for enabling completion of said memory access cycle when said requesting processor ID matches the locking processor ID corresponding to the locked segment for which a match condition was found.

7. A locking circuit as defined in claim 6 wherein said means for enabling completion of said memory access cycle comprises means responsive to said first match signal and said second match signal for enabling completion of the memory access cycle when the requesting processor ID matches the locking processor ID corresponding to the locked segment which matches the target address.

8. In a computer system, a locking circuit for controlling access to locked segments of a shared memory, comprising:
first content-addressable memory means including multiple storage locations for storing addresses of said locked segments and means for simultaneously comparing a target address with contents of each of the storage locations and providing a match signal when said target address matches one of the addresses of said locked segments;

second content-addressable memory means for storing a locking processor identification (ID) corresponding to each of the addresses of said locked segments; and control means responsive to said match signal, said locking processor ID's and a requesting processor ID for inhibiting completion of a memory access cycle when said target address matches one of the addresses of said locked segments and when said requesting processor ID is different from the locking processor ID corresponding to the matched address.

9. A locking circuit as defined in claim 8 further including means for writing addresses of locked segments into said first content-addressable memory.

10. A locking circuit as defined in claim 9 further including means for clearing addresses of locked segments from said first content-addressable memory.

11. In a computer system, a locking circuit for controlling access to locked segments of shared memory, comprising:

first content-addressable means including multiple storage locations for storing addresses of said locked segments and means for simultaneously comparing a target address with contents of each of the storage locations and providing a match signal when said target address matches one of the addresses of said locked segments;

second memory means for storing a locking processor identification (ID) corresponding to each of the addresses of said locked segments, wherein said second memory means comprises a second content-addressable memory including multiple storage locations, each storage location storing a locking processor ID, and means for comparing a requesting processor ID with each of the locking processor ID's and providing a second match signal when said requesting processor ID matches a locking processor ID and wherein said control means includes logic means responsive to match signals from corresponding storage locations in said first memory means and said second memory means for enabling completion of said memory access cycle; and control means responsive to said match signal, said locking processor ID's and a requesting processor ID for inhibiting completion of a memory access cycle when said target address matches one of the addresses of said locked segments and when said requesting processor ID is different from the locking processor ID corresponding to the matched address.

12. A locking circuit for controlling access to locked memory segments of a shared memory in a multiprocessor system comprising:

a first content-addressable memory for storing addresses of the locked memory segments, wherein an address is stored for each locked memory segment, and for comparing a target address with the addresses of the locked memory segments and providing a match signal when said target address matches one of the addresses of the locked memory segments;

means for writing addresses of the locked memory segments into said first content-addressable memory;

means for supplying the target address to said first content-addressable memory during a memory access cycle;

means responsive to said match signal for inhibiting completion of the memory access cycle; and a second content-addressable memory storing a processor ID for each locked memory segment for enabling access to a specified memory segment when the requesting processor is the same processor that locked the specified memory segment.

13. A locking circuit as defined in claim 12 further including means for clearing addresses of the locked memory segments from said first content-addressable memory.

14. A locking circuit as defined in claim 12 further including means for masking selected bits from the comparison of the target address with the address of locked memory segments so that a predetermined block of the shared memory is locked by the address of the locked memory segment.

15. A locking circuit for controlling access to locked memory segments of a shared memory in a multiprocessor system comprising:

a first content-addressable memory for storing addresses of the locked memory segments, wherein an address is stored for each locked memory segment, and for comparing a target address with the addresses of the locked memory segments and providing a match signal when said target address matches one of the addresses of the locked memory segments;

means for writing addresses of the locked memory segments into said first content-addressable memory;

means for supplying the target address to said first content-addressable memory during a memory access cycle;

means responsive to said match signal for inhibiting completion of the memory access cycle;

means for enabling access to a specified memory segment when the requesting processor is the same as the processor that locked the specified memory segment, wherein said enabling means comprises means for storing a locking processor identification (ID) for each of the locked memory segments, comprising a second content-addressable memory, means for comparing a requesting processor ID with the locking processor ID of the locked memory segment that matches the target address and providing an enable signal when the requesting processor ID matches the locking processor ID, and means responsive to the enable signal for enabling completion of the memory access cycle.

16. In a multiprocessor computer system, a locking circuit for controlling access to locked memory segments, comprising:

a first content-addressable memory including multiple storage locations and means for comparing a target address with the contents of each of the storage locations and providing a match signal when said target address matches the contents of one of the storage locations;

means responsive to a locking processor for writing addresses of locked memory segments into the storage locations in said first content-addressable memory;

means responsive to a requesting processor for supplying said target address to said first content-addressable memory during a memory access cycle;

a second content-addressable memory including storage locations for storing a locking processor ID corresponding to each of the locked segments;

means responsive to said match signal for inhibiting completion of a memory access cycle when the requesting processor is different from the locking processor, which is identified by a locking processor ID held in the second content-addressable memory, said locking processor ID corresponding to a memory segment specified by the target address; and means responsive to the locking processor for clearing addresses of locked memory segments from the storage locations in said first content-addressable memory.

17. A method for controlling access to locked segments of a shared memory comprising steps of:

writing addresses of locked segments that have been locked by processors into storage locations in a first content-addressable memory and, for each locked segment, writing a locking processor identification identifying a processor the locked the segment in a second content-addressable memory;

supplying a target address corresponding to a memory address sought to be accessed by a requesting processor to the first content-addressable memory during a memory access cycle, said first content-addressable memory simultaneously comparing the target address with each of the addresses of the locked segments and providing a match signal when the target address matches the address of one of the locked segments; and comparing an identification of the requesting processor with a locking processor identification held in the second content-addressable memory when a match signal is provided; and inhibiting completion of the memory access cycle in response to said match signal if the identification in the second memory means does not match the identification of the requesting processor.

* * * * *